United States Patent [19]

McPherson

[11] 4,041,198

[45] Aug. 9, 1977

[54] APPARATUS AND METHOD FOR FORMING WATER STOPS ON INSULATED PIPE

[75] Inventor: Gerry E. McPherson, Houston, Tex.

[73] Assignee: General Steel Industries, Inc., St. Louis, Mo.

[21] Appl. No.: 618,366

[22] Filed: Oct. 1, 1975

[51] Int. Cl.² .............................................. B05D 3/00
[52] U.S. Cl. .................................... 427/294; 118/50; 118/DIG. 4; 118/DIG. 11; 156/244; 264/90; 264/91; 264/173; 427/295; 427/296
[58] Field of Search ............... 118/DIG. 11, DIG. 4, 118/50, 404, 405; 427/294, 295, 296; 156/244; 264/90, 91, 173

[56] References Cited

U.S. PATENT DOCUMENTS

| | | | |
|---|---|---|---|
| 3,082,144 | 3/1963 | Haleg | 427/296 X |
| 3,533,834 | 10/1970 | Marzocchi | 427/296 |
| 3,661,621 | 5/1972 | Jager | 427/296 X |
| 3,755,523 | 8/1973 | Straub et al. | 264/90 |
| 3,767,454 | 10/1973 | Franke et al. | 427/295 X |
| 3,940,300 | 2/1976 | Priaroggia | 156/244 X |

Primary Examiner—Michael R. Lusignan
Attorney, Agent, or Firm—F. Travers Burgess

[57] ABSTRACT

Apparatus usable in combination with means for extruding a waterproof plastic sheath on foam coating on the exterior of pipe, for reducing the diameter of the plastic sheath adjacent the pipe section ends to conform to the beveled end surfaces of the foam coating and adjacent protruding marginal portions of the pipe surface and thereby form a water stop excluding moisture from the foam thus enclosed by the plastic sheath.

9 Claims, 5 Drawing Figures

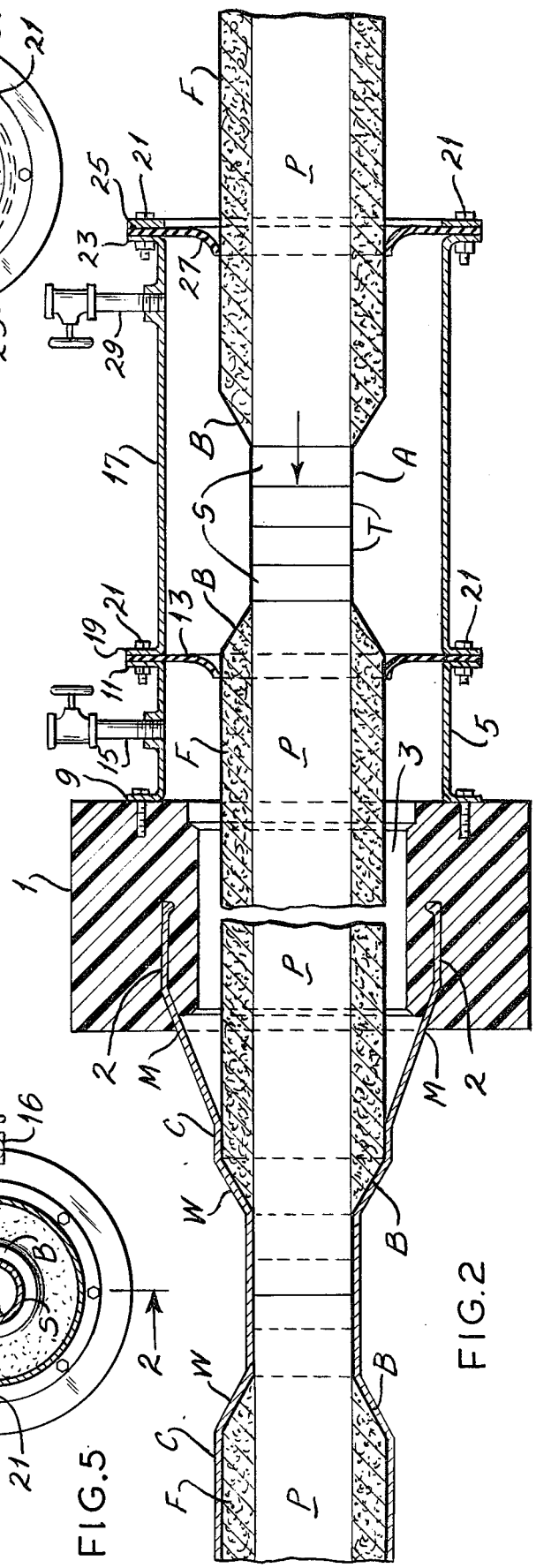

APPARATUS AND METHOD FOR FORMING WATER STOPS ON INSULATED PIPE

BACKGROUND OF THE INVENTION

1. Field of the Invention

The invention relates to apparatus and method of coating pipe and consists particularly in means for applying a moisture seal to the transverse end surfaces of foam coatings on pipes.

2. The Prior Art

On pipe coated with polyurethane foam for thermal insulation purposes and having an external moisture-proof coating or sheath of extruded plastic, the foam coating is normally cut back from the ends of the pipe sections and its end surfaces are beveled. To prevent the intrusion of moisture through exposed end surfaces, accepted practice has been to apply a heat-shrinkable sleeve to this region and shrink it into a close fit over the bevel, the end marginal portion of the plastic sheath and the protruding surface of the pipe.

SUMMARY OF THE INVENTION

The invention provides means for extending an extruded plastic sheath integrally over the beveled end surface of foam insulation on a pipe and the protruding surface of foam coated pipe in close conformity with the beveled surface and the protruding pipe surface in the same operation as the application of the plastic sheath to the cylindrical body of the foam insulation so as to provide a water stop on the beveled end of the insulation integral with the body of the sheath.

BRIEF DESCRIPTION OF THE DRAWINGS

FIG. 1 is a side elevational view of apparatus constructed according to the invention.

FIG. 2 is an enlarged longitudinal diametral sectional view taken along line 2—2 of FIG. 5 showing the pipe coating in longitudinal cross section.

FIG. 3 is a longitudinal diametral sectional view corresponding to FIG. 2 but showing the exterior of the pipe.

FIGS. 4 and 5 are transverse vertical sectional views taken respectively along lines 4—4 and 5—5 of FIG. 3.

DETAILED DESCRIPTION OF THE INVENTION

The numeral 1 denotes an extrusion die having an annular passage 2 for the extrusion therefrom of molten plastic material M and a central cylindrical passageway 3 of sufficient diameter to permit the passage of aligned metal pipe sections P coated with polyurethane foam insulation F except at their abutting ends where insulation F is cut back on a bevel B, leaving several inches of the end of each pipe surface exposed as at S.

Anterior to extrusion die 1 with respect to the direction of pipe travel therethrough, a first cylindrical wall section 5 is attached to the inlet face 7 of die 1 by an annular flange 9 and a similar flange 11 at the remote end of wall section 5 mounts an inwardly positioned annular flap 13 of elastomeric material, preferably gum rubber having a central circular aperture of sufficient diameter to permit passage of the pipe with foam coating F through it while sealingly engaging the outer surface of foam coating F so as to define, with cylindrical wall 5 and the passageway 3 in die 1, a generally annular primary vacuum chamber, the forward end of which is closed by the inner surface of plastic sheath or outer coating C as it is extruded from die 1 on the outer surface of foam coating F.

A conduit 15 connects the chamber surrounded by cylindrical wall section 5 to a vacuum source, to provide a sufficient depression in the chamber to draw plastic coating C radially inwardly toward pipe P in the beveled region B and cut-away end sections S which, along with the outer surface of foam F, have been previously covered with mastic A, except for a margin preferably of about four inches at the abutting pipe ends, which are covered with tape T to prevent the adherence of the plastic coating to the pipe end and facilitate the removal of the plastic coating from the end portion of the pipe surface. A vacuum gauge 16 is mounted on wall section 5 to facilitate determination of the amount of depression in the primary vacuum chamber.

To ensure the maintenance of a vacuum in the primary vacuum chamber, a secondary vacuum chamber is formed anterior to sealing flap 13 and comprises a cylindrical wall 17 slightly longer than the cut-away portions of the foam F on adjacent pipe sections P joined to cylindrical wall 15 by an annular flange 19 secured by bolts 21, passing through the outer peripheral margin of flap 13, to annular flange 11. The entry end of the secondary vacuum chamber is formed by an annular flange 23 on wall 15 to which is clamped, by means of a back-up ring 25, a second sealing flap 27 of the same form and construction as flap 13. The secondary vacuum chamber surrounded by wall 17 is connected by a conduit 29 to a source of vacuum, and is also provided with a vacuum gauge 30.

Operation of the device to apply integral water stops to pipe sections P which have been coated with foam insulation F beveled as at B at its ends and with the outer surface of insulation F including beveled portions B, along with the protruding ends of the pipe surface coated with mastic A, is as follows: As the line of pipe sections P approaches extrusion die 7 for application of plastic coating C, it passes through secondary and primary vacuum chambers surrounded respectively by cylindrical walls 17 and 5, the preservation of vacuum in the primary chamber being ensured by the vacuum provided in the secondary chamber. As the molten plastic coating being extruded onto the outer mastic-coated surface of foam insulation C approaches the beveled portion B, the vacuum in the primary vacuum chamber draws the coating radially inwardly onto the mastic-coated beveled surface B as at W, over the exposed mastic-coated parts S of the pipe end sections and over the taped ends T of the adjacent pipe section.

The resultant plastic coating forms highly effective water stops W at each end of the pipe which are integral with the exterior plastic coating C on the outer cylindrical surface of the foam insulation, thus eliminating the inconvenience, time and expense of applying separate water stops.

Satisfactory results can be obtained without the use of a secondary chamber if length of the reduced diameter portions of the work are less than the length of the primary chamber or if the diameter of the die passageway is only slightly greater than the outside diameter of the insulating material.

The details of the apparatus may be varied substantially without departing from the spirit of the invention and the exclusive use of such modifications as come within the scope of the appended claims is contemplated.

I claim:

1. Apparatus for applying a continuous coating to alternating full and reduced diameter portions of cylindrical surfaces of an elongated workpiece comprising means forming a cylindrical passage of larger diameter than the workpiece to permit the passage of the work therethrough, an extrusion die forming the outlet of said passage, an annular outlet orifice in said extrusion die for extruding the coating on said workpiece as the latter passes out of said die, said passage having a flexible annular flap on its anterior end sealingly engageable with the cylindrical surface of the workpiece to form, with the exterior surface of the workpiece, said cylindrical passage, and the annular portion of the coating between the die outlet and the workpiece, a primary vacuum chamber, a vacuum source, conduit means connecting said primary vacuum chamber to said vacuum source, means forming an additional passage of larger diameter than the workpiece and at least as long as the reduced diameter portions of the workpiece aligned with said cylindrical passage anterior to said flexible annular flap and having a similar flap on its anterior end to form, with the exterior surface of said workpiece, said additional passage, and said first-named flap, a secondary vacuum chamber, and conduit means connecting said secondary vacuum cleaner to said vacuum source.

2. Apparatus according to claim 1 wherein said secondary vacuum chamber comprises a peripheral wall structure secured to said passage forming means anterior to said flap and having a similar flap on its anterior end, there being a conduit means connecting said secondary vacuum chamber to a vacuum source.

3. Apparatus according to claim 2 wherein the opening in each of said annular flaps is of sufficient size to permit passage therethrough of the full diameter portions of the cylindrical member while sealingly engaging the surface thereof.

4. Apparatus according to claim 3 wherein each of said chambers mounts a vacuum gauge.

5. Apparatus according to claim 1 wherein said elongated workpiece comprises a plurality of aligned pipe sections each having a coating of insulation material terminating short of its ends by a conically beveled portion, leaving its end portions clear, the insulation-coated portions of the pipe sections forming the full diameter portions and the beveled portions and the clear end portions of abutting pipe sections forming the reduced diameter portions.

6. The method of applying protective plastic sheathing to an elongated generally cylindrical workpiece having alternating large and small diameter sections, comprising the steps of passing the workpiece through a first annular sealing flap of flexible material into a first passageway of larger diameter than the maximum diameter of the workpiece and thence through a second annular sealing flap of flexible material into a second passageway of larger diameter than the maximum diameter of the workpiece, the distance between the sealing flaps being sufficient that at all times at least one of the sealing flaps is in sealing engagement with a large diameter section of the workpiece, applying a vacuum to the chamber defined by said first and second flaps, the first passageway and the exterior surface of the workpiece, passing the workpiece through an extrusion die annularly spaced from and surrounding the workpiece and forming the outlet end of said second passageway, extruding plastic sheathing material from the extrusion die onto the workpiece and applying a vacuum to the chamber defined by the second annular sealing flap, the second passageway, the outer surfaces of the workpiece, and the annular portion of the plastic sheathing material between the outer surface of the workpiece and the outlet of the extrusion die to draw the extruded plastic material into close conformity with the exterior surface of the workpiece including the minimum diameter portions thereof.

7. The method according to claim 6 wherein the workpiece comprises a series of aligned pipe sections, each of which is coated intermediate its ends with insulation material to form the large diameter portions of the workpiece, the ends of the insulation coating being beveled and spaced from the ends of the respective pipe sections to leave the abutting ends of the pipe sections clear and of less diameter than the insulation coated portions.

8. The method according to claim 7 including the step of coating the exposed end portions of the pipe sections and the entire insulation of each with mastic material prior to passage of the respective pipe section into the vacuum chambers.

9. The method according to claim 8 including the step of wrapping the extremities of each pipe section with tape prior to application of mastic material to prevent the adherence of the outer plastic coating to the extremities of the pipe section and facilitating its removal therefrom.

* * * * *

UNITED STATES PATENT OFFICE
CERTIFICATE OF CORRECTION

Patent No. 4,041,198   Dated August 9, 1977

Inventor(s) Gerry E. McPherson

It is certified that error appears in the above-identified patent and that said Letters Patent are hereby corrected as shown below:

Column 3, line 25, "vacuum cleaner" should read
--vacuum chamber--.

Signed and Sealed this

Fifteenth Day of November 1977

[SEAL]

Attest:

RUTH C. MASON  
Attesting Officer

LUTRELLE F. PARKER  
Acting Commissioner of Patents and Trademarks